(12) United States Patent
Sukumar et al.

(10) Patent No.: US 11,027,627 B2
(45) Date of Patent: Jun. 8, 2021

(54) ADJUSTMENT MECHANISM FOR A POWER SEAT

(71) Applicant: GM Global Technology Operations LLC, Detroit, MI (US)

(72) Inventors: Nithish Sukumar, Karur (IN); Prathiba R, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 16/441,590

(22) Filed: Jun. 14, 2019

(65) Prior Publication Data

US 2020/0391618 A1    Dec. 17, 2020

(51) Int. Cl.
*B60N 2/06* (2006.01)
*B60N 2/02* (2006.01)

(52) U.S. Cl.
CPC .......... *B60N 2/067* (2013.01); *B60N 2/0232* (2013.01); *B60N 2002/0236* (2013.01)

(58) Field of Classification Search
CPC .................. B60N 2/067; B60N 2/0232; B60N 2002/0236; B60N 2/07
USPC ............ 297/362.14, 362.12, 362.11, 344.11; 430/430, 429
See application file for complete search history.

(56) References Cited

U.S. PATENT DOCUMENTS

| | | | | |
|---|---|---|---|---|
| 2,929,438 A * | 3/1960 | Homier | ................ | B60N 2/0232 248/393 |
| 2,964,093 A * | 12/1960 | Lohr | .................... | B60N 2/0232 248/429 |
| 3,124,332 A * | 3/1964 | Heyl, Jr. | .............. | B60N 2/0232 248/420 |
| 5,762,309 A * | 6/1998 | Zhou | ....................... | B60N 2/919 248/429 |
| 5,797,293 A * | 8/1998 | Chaban | ................ | B60N 2/0232 74/89.36 |
| 5,797,576 A * | 8/1998 | Gauger | .................. | B60N 2/067 248/429 |
| 5,860,319 A * | 1/1999 | Via | ....................... | B60N 2/0232 248/429 |
| 6,038,127 A * | 3/2000 | Ries | ...................... | G06F 3/0202 200/5 A |
| 6,244,660 B1 * | 6/2001 | Yoshimatsu | ......... | B60N 2/0232 248/429 |
| 6,499,712 B1 * | 12/2002 | Clark | .................... | B60N 2/0232 248/424 |
| 2005/0035261 A1 * | 2/2005 | Goodbred | .............. | B60N 2/067 248/429 |
| 2008/0163708 A1 * | 7/2008 | Porinsky | ............. | F16H 25/2021 74/89.14 |
| 2009/0236488 A1 * | 9/2009 | Koga | ................... | B60N 2/0705 248/429 |

(Continued)

FOREIGN PATENT DOCUMENTS

JP       01009043 A  *  1/1989  ............ B60N 2/067
WO   WO-2020042947 A1 *  3/2020

*Primary Examiner* — Kimberly T Wood

(57) ABSTRACT

An adjustment mechanism for a motor vehicle seat includes an annular motor with an inner nut housed in a rotor, a bracket attached to the seat, the annular motor being positioned in the bracket, and a lead screw that is threaded through the inner nut. When the annular motor is activated the rotor as well as the inner nut rotate about the lead screw resulting in relative translational motion of the bracket and hence the seat relative to the lead screw.

17 Claims, 3 Drawing Sheets

(56) References Cited

U.S. PATENT DOCUMENTS

| | | | | |
|---|---|---|---|---|
| 2009/0243326 A1* | 10/2009 | Kimata | ................ | B60N 2/0715 |
| | | | | 296/65.15 |
| 2010/0243852 A1* | 9/2010 | Muraishi | ................ | B60N 2/067 |
| | | | | 248/429 |
| 2011/0278419 A1* | 11/2011 | Sovis | ..................... | B60N 2/067 |
| | | | | 248/429 |
| 2013/0276562 A1* | 10/2013 | Sheridan | ................ | B60N 2/067 |
| | | | | 74/89.32 |
| 2018/0323678 A1* | 11/2018 | Niemann | ................ | B60N 2/853 |
| 2020/0198502 A1* | 6/2020 | Jeong | ....................... | B60N 2/08 |

* cited by examiner

ADJUSTMENT MECHANISM FOR A POWER SEAT

INTRODUCTION

The present disclosure relates to seat for a motor vehicle. More specifically, the present disclosure relates to an adjustment mechanism for a power seat.

Most motor vehicles have seat assemblies that are adjustable to satisfy the comfort and operational requirements of the occupants of the seat. For example, most seats have a control mechanism that allows the occupant of the seat to move the seat forward or rearward. Although many control mechanisms are purely mechanical, some control mechanisms are motorized. That is, the seat assembly includes one or more motors that receive electrical energy to operate the control mechanism to enable the occupant to adjust the seat position. The adjustment of these motorized seats, however, may require the occupant to wait an undesirable amount of time for the adjustment.

Thus, while current seat adjust mechanisms achieve their intended purpose, there is a need for a new and improved system to adjust the seat position of seat assemblies in motor vehicles.

SUMMARY

According to several aspects, an adjustment mechanism for a motor vehicle seat includes an annular motor with an inner nut housed in a rotor, a bracket attached to the seat, the annular motor being positioned in the bracket, and a lead screw that is threaded through the inner nut. When the annular motor is activated the rotor as well as the inner nut rotate about the lead screw resulting in relative translational motion of the bracket and hence the seat relative to the lead screw.

In an additional aspect of the present disclosure, wherein the adjustment mechanism further includes a roller guide that enables movement of the bracket relative to a cabin floor.

In another aspect of the present disclosure, the annular motor includes a stator that surrounds the rotor.

In another aspect of the present disclosure, a winding is housed within the stator.

In another aspect of the present disclosure, the adjustment mechanism further includes a main motor coupled to the lead screw.

In another aspect of the present disclosure, the main motor is coupled to the lead screw with a gear box.

In another aspect of the present disclosure, when the main motor is activated, the lead screw rotates within the inner nut resulting in relative translational motion of the bracket and hence the seat relative to the lead screw.

In another aspect of the present disclosure, when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to the speed of movement of the bracket relative to the lead screw.

In another aspect of the present disclosure, a controller is electrically connected to the annular motor and the main motor.

In another aspect of the present disclosure, an energy source provides power to the annular motor and the main motor.

According to several aspects, an adjustment mechanism for a motor vehicle seat includes an annular motor with an inner nut housed in a rotor, a bracket attached to the seat, the annular motor being positioned in the bracket, a lead screw that is threaded through the inner nut, the rotor as well as the inner nut rotating about the lead screw when the annular motor is activated resulting in relative translational motion of the bracket and hence the seat relative to the lead screw, and a main motor coupled to the lead screw, the lead screw rotating within the inner nut when the main motor is activated resulting in relative translational motion of the bracket and hence the seat relative to the lead screw.

In another aspect of the present disclosure, when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to the speed of movement of the bracket relative to the lead screw.

In another aspect of the present disclosure, the adjustment mechanism further includes a roller guide that enables movement of the bracket relative to a cabin floor.

In another aspect of the present disclosure, the annular motor includes a stator that surrounds the rotor.

In another aspect of the present disclosure, a winding is housed within the stator.

In another aspect of the present disclosure, the main motor is coupled to the lead screw with a gear box.

In another aspect of the present disclosure, a controller is electrically connected to the annular motor and the main motor.

In another aspect of the present disclosure, an energy source provides power to the annular motor and the main motor.

According to several aspects, a seat assembly for a motor vehicle includes an adjustment mechanism and a roller guide that enables movement of the seat relative to a cabin floor. The adjustment mechanism includes an annular motor with an inner nut housed in a rotor, a bracket attached to the seat, the annular motor being positioned in the bracket, a lead screw that is threaded through the inner nut, the rotor as well as the inner nut rotating about the lead screw when the annular motor is activated resulting in relative translational motion of the bracket and hence the seat relative to the lead screw, and a main motor coupled to the lead screw, the lead screw rotating within the inner nut when the main motor is activated resulting in relative translational motion of the bracket and hence the seat relative to the lead screw.

In another aspect of the present disclosure, when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to the speed of movement of the bracket relative to the lead screw.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
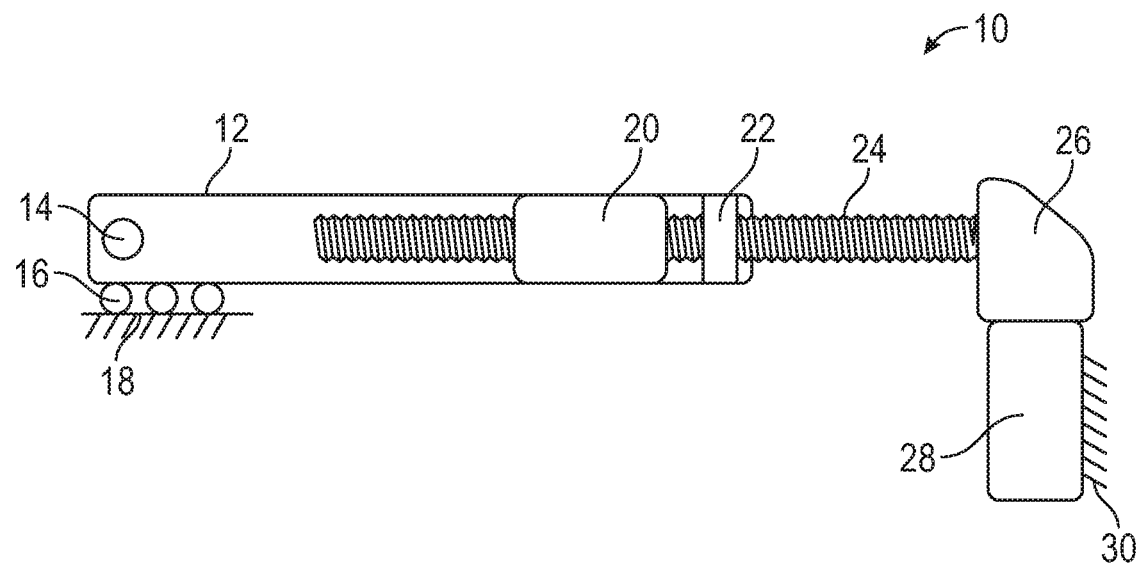
FIG. 1 is a side view of an adjustment mechanism for a motor vehicle seat in accordance with the present disclosure.
Figure 2:
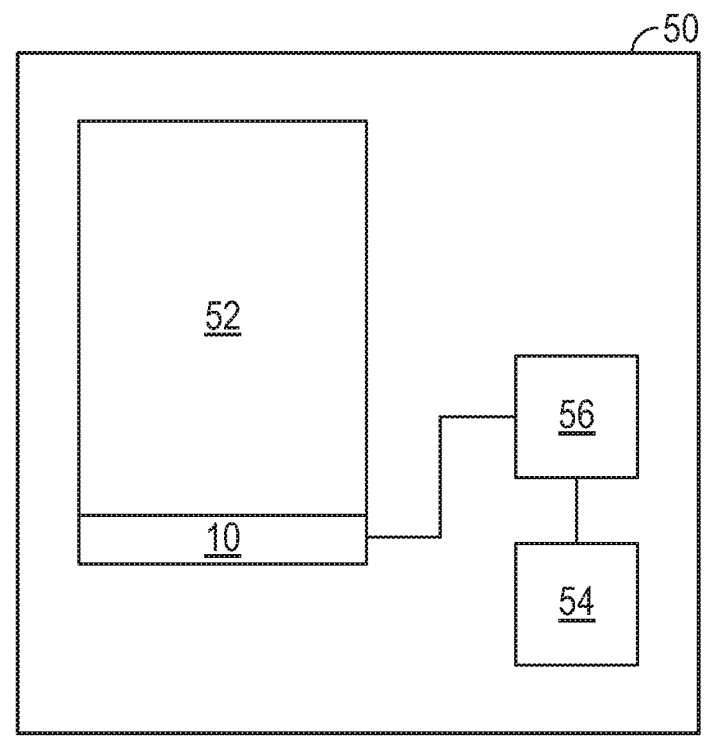
FIG. 2 is a schematic block diagram of a motor vehicle with the adjustment mechanism in accordance with the present disclosure.

Referring to FIGS. 1 and 2, there is shown an adjustment mechanism 10 utilized to move a seat 52 within a cabin of a motor vehicle 50. The adjustment mechanism 10 includes a bracket 12 with an attachment hole that enables attaching the seat 52 to the bracket 12, for example, with a bolt or any other suitable attachment mechanism. The adjustment mechanism 10 also includes a slide feature such as a roller guide 16 that enables the bracket 12 and hence the seat 52 to move relative, for example, to a floor of a cabin 18 in which occupants of the motor vehicle 50 reside.

Positioned in the bracket 12 is an annular motor 20. The annular motor 20 is secured to the interior of the bracket 12 to prevent relative motion between the bracket 12 and the annular motor 20. The adjustment mechanism 10 further includes a lead screw 24 coupled to a main motor 28 with a gear box 26. The main motor 28 is attached, for example, to the floor or a frame portion 30 of the motor vehicle to prevent movement of the main motor 28 so that the main motor 28 remains stationary.

The gear box 26 includes one or more gears that transmit energy from the main motor 28, for example, from rotational movement of a coupler attached to the gear box 26, to rotational movement of the lead screw 24. The lead screw 24 is supported by an annular guide 22 but does not engage with the annular guide in a threaded manner. Accordingly, the lead screw slides through the annular guide 22 and extends through the annular motor 20 and into the bracket 12.

Figure 3A:
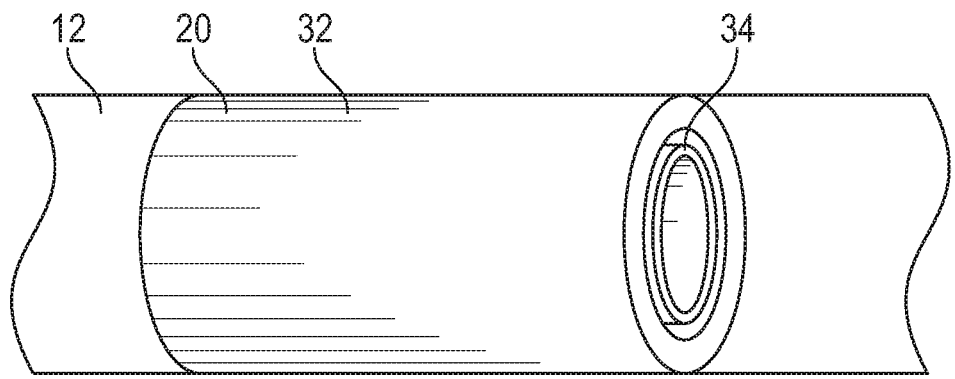
FIG. 3A is a close-up view of an annular motor for the adjustment mechanism in accordance with the present disclosure.
Figure 3B:
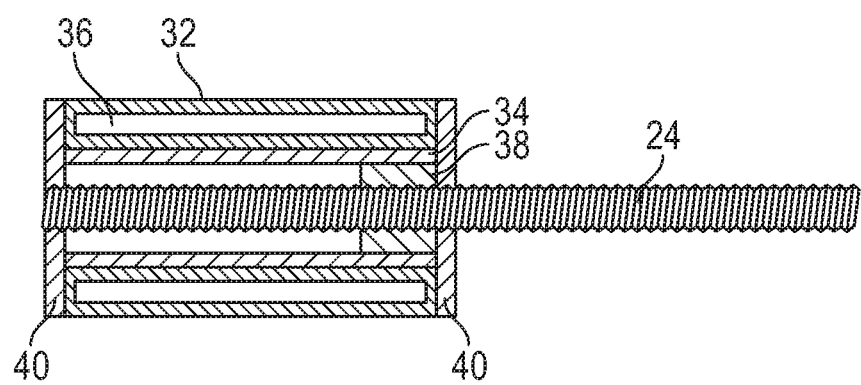
FIG. 3B is interior view of the annular motor in accordance with the present disclosure.

Referring to FIGS. 3A and 3B, the annular motor 20 includes a stator 32 with a winding 36 encased in the stator 32. A threaded nut 38 is positioned in a rotor 34 in a fixed manner to prevent movement, rotationally and translationally, relative to the rotor 34. The rotor 34 along with the nut 38 are able to rotate relative to the stator 32. A pair of end caps 40 constrain axial movement, along an axis through the lead screw 24, of the rotor 34 and the nut 38 relative to the stator 32. Hence, the rotor 34 and the nut 38 are able to rotate about the lead screw 24 relative to the stator 32 but the rotor 34 and the nut 38 are not able to translate relative to the stator 32.

Figure 4A:
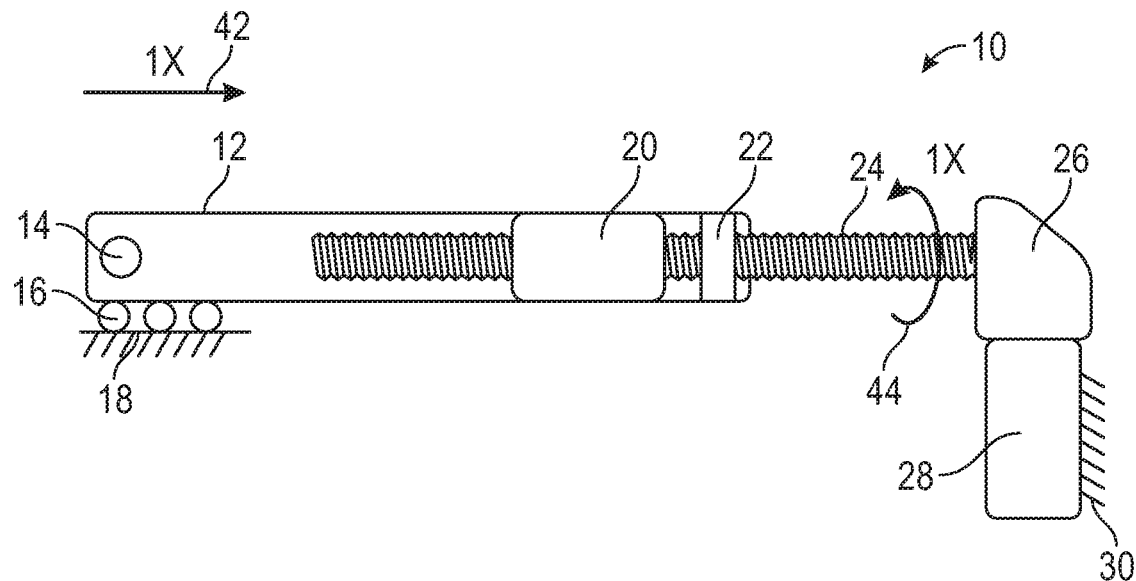
FIG. 4A is a side view of the adjustment mechanism showing movement of a bracket when a main motor is activated in accordance with the present disclosure.

As indicated above, the nut 38 is threaded such that the lead screw 24 screws through the nut 38 as either or both the nut 38 and the lead screw 24 rotate. As such, when the gear box 26 transmits rotational energy from the main motor 28 to the lead screw 24 such that the lead screw 24 rotates, as indicated by the arrow 44 (FIG. 4A), the lead screw rotates with respect to the nut 38 which pushes or pulls the bracket 12. For example, when the lead screw 24 rotates in a first direction as indicated by the arrow 44, the bracket 12 and hence the seat 52 moves in the direction indicated by the arrow 42. Alternatively, if the lead screw 24 rotates in an opposite direction, the bracket 12 and the seat 52 are pushed in an opposite direction to the arrow 42.

Figure 4B:
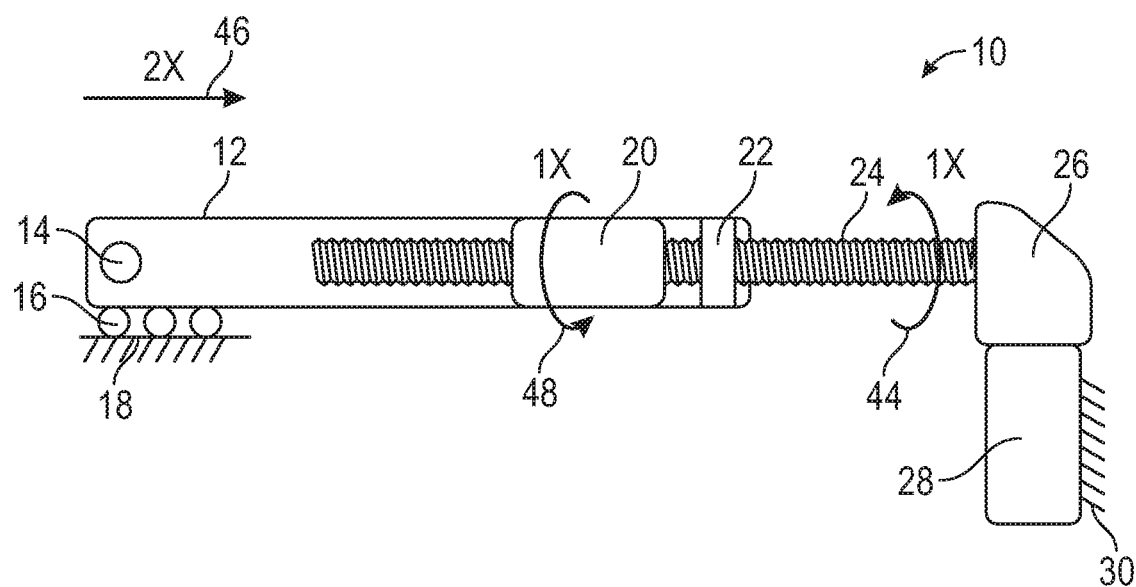
FIG. 4B is a side view of the adjustment mechanism showing movement of the bracket when both the annular motor and the main motor are activated in accordance with the present disclosure.

In certain applications, as shown in FIG. 4B, the lead screw 24 rotates in the first direction, as indicated by the arrow 44, and energy supplied to the annular motor 20 induces the rotor 34 and the nut 38 to rotate in a second direction that is opposite of the first rotation direction, as indicated by the arrow 48. The rotational movement of the lead screw 24 and that of the nut 38 therefore act as a multiplier to the movement of the bracket 12. That is, the speed of movement, shown as an arrow 46, of the bracket 12 and the seat 52 is about twice the movement of the bracket 12 and the seat 52 when only the lead screw 24 rotates. Hence, counter rotation of the nut 38 and the lead screw 24 creates a push or pull force that enables the bracket 12 and the seat 52 to translate at twice the speed in comparison to utilizing only the rotation of the lead screw 24.

In various arrangements, the adjustment mechanism 10 (specifically the annular motor 20 and the main motor 28) is electrically connected to a controller 56 that is operated, for example, by an occupant of the seat 52. The controller 56 receives energy from a source 54, such as, a battery. The controller 56 transmits energy in a varied manner to control the operation of the annular motor 20 and the main motor 30 to move the seat 52 according to the desires of the occupant of the seat 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An adjustment mechanism for a motor vehicle seat, the adjustment mechanism comprising:
    an annular motor with an inner nut housed in a rotor;
    a bracket attached to the seat, the annular motor being positioned in the bracket; and
    a lead screw that is threaded through the inner nut;
    a single main motor; and
    a single gear box, the single main motor being directly coupled to the single gear box, the single gear box being coupled to the lead screw,
    wherein when the annular motor is activated the rotor as well as the inner nut rotate about the lead screw resulting in relative translational motion of the bracket and hence the seat relative to the lead screw.

2. The adjustment mechanism of claim 1 further comprising a roller guide that is enables movement of the bracket relative to a floor of a cabin.

3. The adjustment mechanism of claim 1, wherein the annular motor includes a stator that surrounds the rotor.

4. The adjustment mechanism of claim 3, wherein a winding is housed within the stator.

5. The adjustment mechanism of claim 1, wherein when the main motor is activated, the lead screw rotates within the inner nut resulting in relative translational motion of the bracket and hence the seat relative to the lead screw.

6. The adjustment mechanism of claim 5, wherein when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to a speed of movement of the bracket relative to the lead screw.

7. The adjustment mechanism of claim 1 further comprising a controller that is electrically connected to the annular motor and the main motor.

8. The adjustment mechanism of claim 7 further comprising an energy source that provides power to the annular motor and the main motor.

9. An adjustment mechanism for a motor vehicle seat, the adjustment mechanism comprising:
   an annular motor with an inner nut housed in a rotor;
   a bracket attached to the seat, the annular motor being positioned in the bracket;
   a lead screw that is threaded through the inner nut, the rotor as well as the inner nut rotating about the lead screw when the annular motor is activated resulting in relative translational motion of the bracket and hence the seat relative to the lead screw;
   a single main motor; and
   a single gear box, the single main motor being directly coupled to the single gear box, the single gear box being coupled to the lead screw,
   the lead screw rotating within the inner nut when the main motor is activated resulting in relative translational motion of the bracket and hence the seat relative to the lead screw.

10. The adjustment mechanism of claim 9, wherein when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to a speed of movement of the bracket relative to the lead screw.

11. The adjustment mechanism of claim 9 further comprising a roller guide that is enables movement of the bracket relative to a floor of a cabin.

12. The adjustment mechanism of claim 9, wherein the annular motor includes a stator that surrounds the rotor.

13. The adjustment mechanism of claim 12, wherein a winding is housed within the stator.

14. The adjustment mechanism of claim 9 further comprising a controller that is electrically connected to the annular motor and the main motor.

15. The adjustment mechanism of claim 14 further comprising an energy source that provides power to the annular motor and the main motor.

16. A seat assembly for a motor vehicle, the seat assembly comprising:
   an adjustment mechanism that includes:
      an annular motor with an inner nut housed in a rotor;
      a bracket attached to the seat, the annular motor being positioned in the bracket;
      a lead screw that is threaded through the inner nut, the rotor as well as the inner nut rotating about the lead screw when the annular motor is activated resulting in relative translational motion of the bracket and hence the seat relative to the lead screw;
      a single main motor; and
      a single gear box, the single main motor being directly coupled to the single gear box, the single gear box being coupled to the lead screw
      the lead screw rotating within the inner nut when the main motor is activated resulting in relative translational motion of the bracket and hence the seat relative to the lead screw; and
   a roller guide that is enables movement of the seat relative to a floor of a cabin.

17. The seat assembly of claim 16, wherein when both the main motor and the annular motor are activated, the lead screw rotates with a first rotational direction and the rotor and hence the inner nut rotate in a second rotational direction that is opposite to the first rotational direction, the rotation of the lead screw and the rotation of the inner nut acting as a multiplier to a speed of movement of the bracket relative to the lead screw.

* * * * *